United States Patent [19]

Kanazawa

[11] Patent Number: 5,448,127
[45] Date of Patent: Sep. 5, 1995

[54] VIBRATION WAVE DRIVEN MOTOR

[75] Inventor: Hajime Kanazawa, Tama, Japan

[73] Assignee: Canon Kabushiki Kaisha, Tokyo, Japan

[21] Appl. No.: 86,374

[22] Filed: Jul. 6, 1993

Related U.S. Application Data

[63] Continuation of Ser. No. 699,008, May 13, 1991, abandoned.

[30] Foreign Application Priority Data

May 15, 1990 [JP] Japan .................. 2-124710

[51] Int. Cl.⁶ .................. H02N 2/00; H01L 41/08
[52] U.S. Cl. .................. 310/323; 310/366
[58] Field of Search .................. 310/323, 363, 366

[56] References Cited

U.S. PATENT DOCUMENTS

| | | | |
|---|---|---|---|
| 2,472,179 | 6/1949 | Tibbbetts | 310/363 |
| 4,504,760 | 3/1985 | Yamamoto et al. | 310/323 |
| 4,513,219 | 4/1985 | Katsuma et al. | 310/363 |
| 4,633,122 | 12/1986 | Padice | 310/363 |
| 4,983,874 | 1/1991 | Yamaguchi | 310/323 |

FOREIGN PATENT DOCUMENTS

| | | | |
|---|---|---|---|
| 0862778 | 1/1953 | Germany | 310/366 |
| 3504011 | 8/1986 | Germany | 310/363 |
| 0400515 | 12/1942 | Italy | 310/366 |
| 0035482 | 4/1981 | Japan | 310/366 |
| 0253873 | 11/1986 | Japan | 310/363 |
| 0181676 | 7/1988 | Japan | 310/323 |
| 0181677 | 7/1988 | Japan | 310/323 |
| 2231969 | 9/1990 | Japan | 310/323 |
| 0570043 | 6/1945 | United Kingdom | 310/366 |

OTHER PUBLICATIONS

"Flexure Mode Oscillators", Author unknown, Marconi Review, vol. XVI, No. 111, Oct. 15, 1953 pp. 145 and 150 only.

*Primary Examiner*—Thomas M. Dougherty
*Attorney, Agent, or Firm*—Fitzpatrick, Cella, Harper & Scinto

[57] ABSTRACT

A vibration wave driven motor having an electromechanical energy conversion member for generating a vibration wave in an elastic member. This conversion member has first and second surfaces opposite to each other, and first and second surfaces respectively formed on the first and second electrodes to receive an applied electrical signal. The first electrode is formed in a position such as to face one side of the elastic member and has an electrical signal input terminal provided on the second surface side of the conversion member. This input terminal and the first electrode are electrically connected by, for example, a conductor formed in a through hole. It is thereby possible to supply an electric current to each electrode with reliability while maintaining the conversion member and the elastic member in desired close contact with each other.

14 Claims, 10 Drawing Sheets

VIBRATION WAVE DRIVEN MOTOR

This application is a continuation of application Ser. No. 07/699,008 filed May 13, 1991, now abandoned.

BACKGROUND OF THE INVENTION

1. Field of the Invention

This invention relates to a vibration wave driven motor in which a movable member is frictionally driven by a vibration member and, more particularly, to the structure of an electricity supply means for such a motor.

2. Description of the Related Art

Vibration wave driven motors, in which a vibrational motion of an electro-mechanical energy conversion element such as a piezoelectric element caused when an alternating wave voltage is applied to the element is converted into a rotational motion or one-dimensional motion, have a simpler structure and a smaller size in comparison with conventional electromagnetic motors because they require no coil winding. Also, they are capable of obtaining a large torque even at a low rotational speed. They have attracted attention in recent years because of these advantages.

Figure 9:
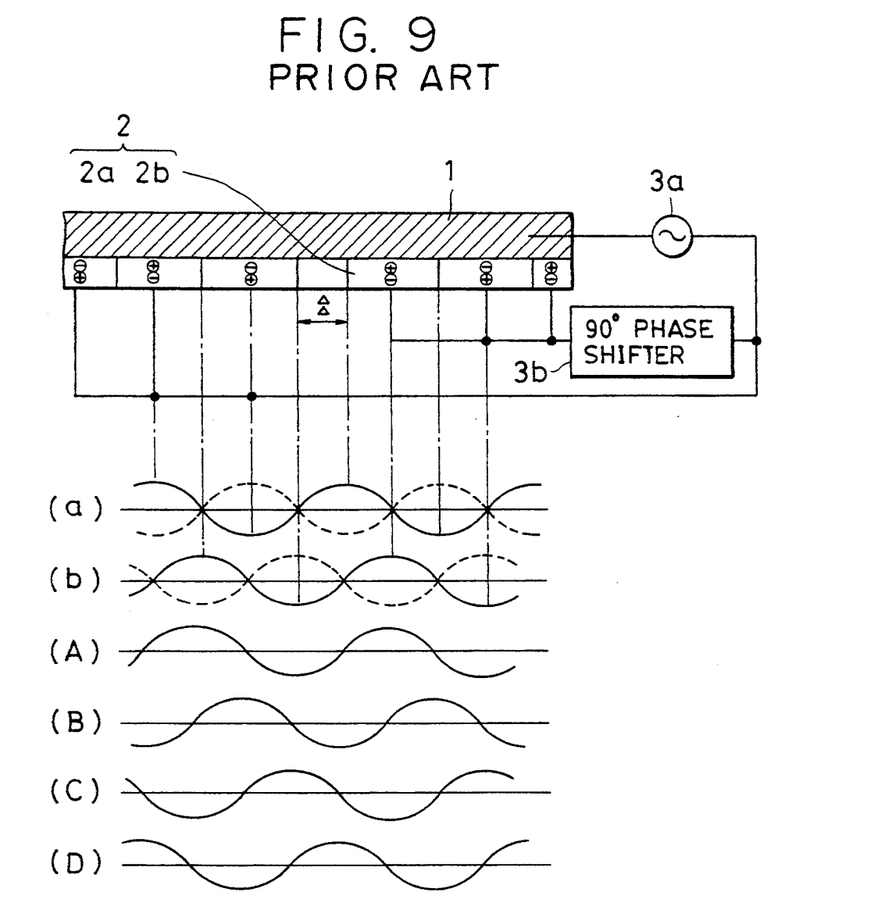
FIG. 9 is a schematic diagram of a conventional vibration motor.
Figure 10:
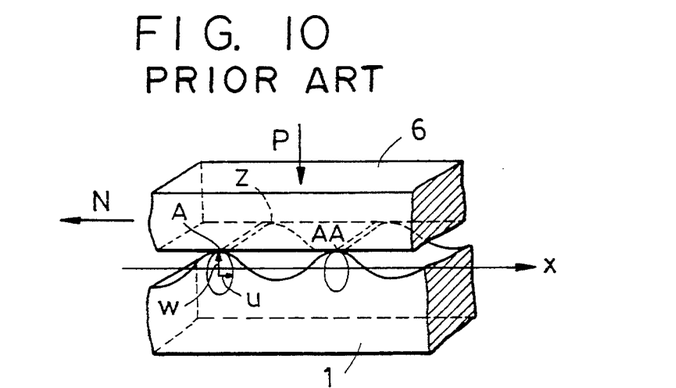
FIG. 10 is a diagram of the principle of driving of the vibration motor.

FIGS. 9 and 10 show the principle of driving of a vibration wave driven motor, and FIG. 9 shows vibration waves generated in a vibration member of the motor. Piezoelectric elements 2a and 2b, arranged into a piezoelectric plate 2, form electro-mechanical energy conversion elements and are bonded to a vibrating member 1 (ordinarily, a metallic member). Elements 2a and 2b are arranged in positions relatively shifted λ/4 where λ is the wavelength in the vibrating member. The piezoelectric elements 2a and 2b and the vibrating member 1 constitute a stator.

In the case of a conventional motor, a common electrode is provided on one of two surfaces of each of piezoelectric elements 2a and 2b in contact with the vibrating member 1 which is conductive, and an electrode is provided on the other surface of each piezoelectric element 2a or 2b. Each element is previously polarized as indicated by ⊕ and ⊖ in FIG. 9. An AC voltage of V=Vosinωt is applied to the piezoelectric element 2a from an AC power source 3a, while an AC voltage of V=Vosin(ωt±π/2) phase-shifted by π/2 is applied to the piezoelectric element 2b through a 90° phase shifter 3b. (+) and (−) in the above equation are changed over by the phase shifter 3b according to the direction in which the movable member 6 is moved. It is assumed here that (−) is selected and that a voltage of V=Vosin(ωT−π/2) is being applied to the piezoelectric element 2b. If the piezoelectric element 2a is oscillated alone by the voltage V=Vosin ωt, vibration of a standing wave such as that shown in (a) of FIG. 9 occurs. If only the piezoelectric element 2b is oscillated by the voltage V=Vosin (ωt−π/2), vibration of a standing wave such as that shown in (b) of FIG. 9 occurs. When these two AC voltages out of phase with each other are simultaneously applied to the piezoelectric elements 2a and 2b, the vibration wave becomes a traveling wave. A wave shown in (A) of FIG. 9 is exhibited at a time t=2nπ/ω, a wave in (B) is exhibited at a time t=π/2ω+2nπ/ω, a wave in (C) is exhibited at a time t=π/ω+2nπ/ω, and a wave in (D) is exhibited at a time t=3π/2ω+2nπ/ω. The wave front of the vibration wave advances in the direction×(FIG. 10).

This traveling vibration wave involves a longitudinal wave and a transverse wave. As shown in FIG. 10, with respect to a mass point A of the vibrating member 1, a counterclockwise revolving ellipsoidal motion defined by the longitudinal amplitude u and the transverse amplitude w is caused. A movable member 6 is maintained in contact with the surface of the vibrating member 1 by being pressed against the same. The movable member 6 contacts the vibrating member 1 at the apexes of the vibrating surface alone. (Actually, it contacts vibrating member surfaces of a certain width in the wave travel direction). The movable member 6 is driven by the longitudinal amplitude u component of the ellipsoidal motion of mass points A, AA, . . . at the apexes to move in the direction of the arrow N. When the 90° phase shifter shifts the phase by+90°, the vibration wave travels in the direction −x, and the movable member 6 moves in the direction opposite to the direction N.

The AC voltage applied to such a vibration wave motor must be high enough to move the movable member 6, ordinarily several ten volts p-p or higher. Accordingly, for use in a small apparatus using ordinary dry batteries on the market, a means for boosting the voltage, e.g., a transformer is required.

Figure 11:
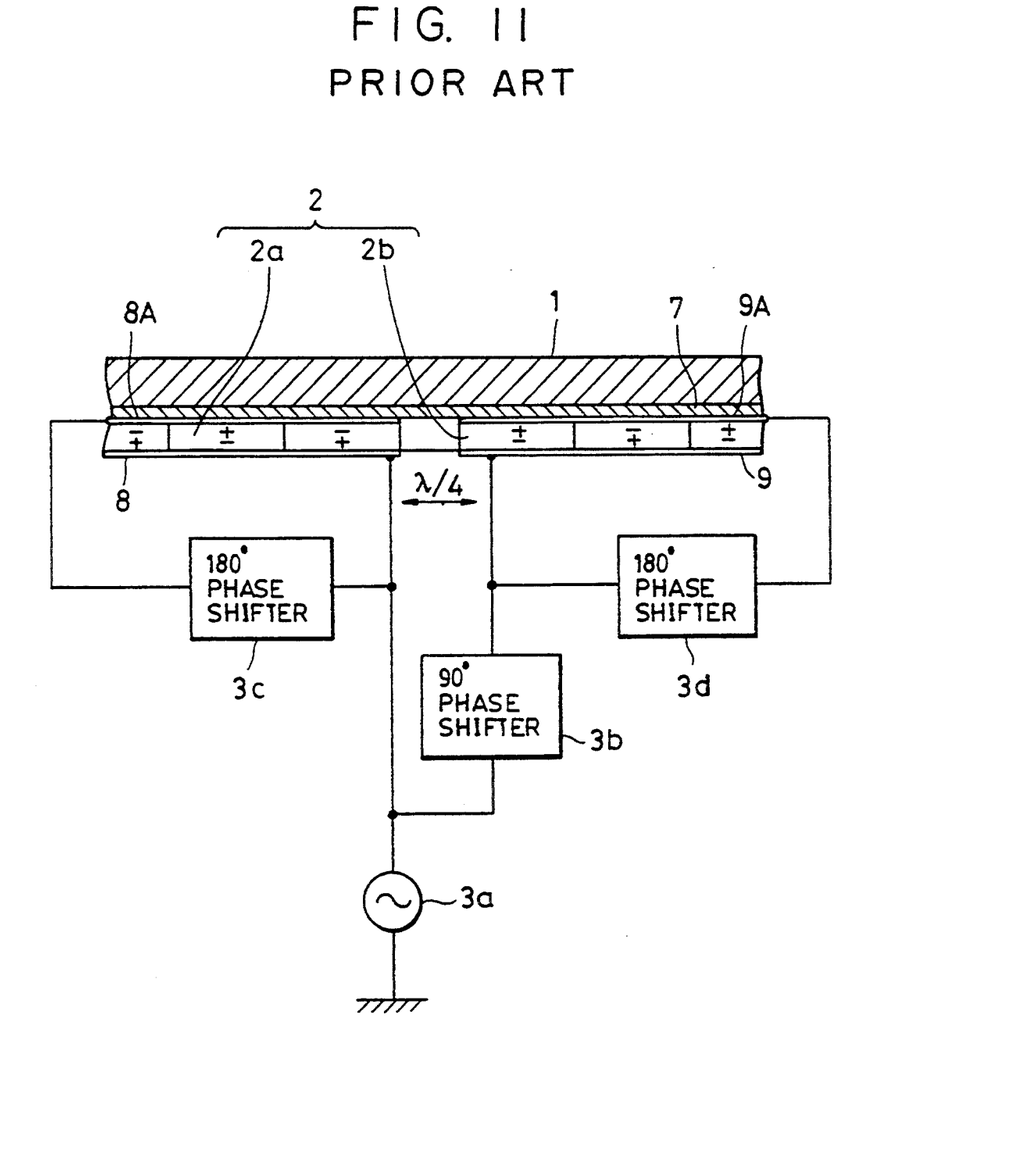
FIG. 11 is a schematic diagram of another conventional vibration motor.

To cope with this problem, the applicant of the present invention has already proposed a vibration motor having a stator constructed as shown in FIG. 11 (Japanese Patent Laid-Open No. 59-96882). That is, the conductive vibrating member 1, an electrode 8A on the vibrating member side of the piezoelectric element 2a (hereinafter referred to as reverse electrode 8A), and an electrode 9A on the vibrating member side of the piezoelectric element 2b (hereinafter referred to as reverse electrode 9A) are electrically insulated from each other by insulating layer 7, and an AC voltage which is provided by inverting the AC voltage applied to electrodes 8, 9 on the side remote from the vibrating member (hereinafter referred to as obverse electrodes 8, 9) is applied to the reverse electrodes 8A, A. Theoretically, the same function and performance can be achieved by applying to this motor an AC voltage which is half the voltage required in the arrangement shown in FIG. 9. The insulator 7 which electrically insulates the reverse electrode 8A and 9A and the vibrating member 1 is unnecessary if the vibrating member 1 is not electrically conductive.

In the arrangement of FIG. 11, however, the thickness of the reverse electrodes 8A and 9A is very small (1 μm or less) and it is therefore very difficult to apply AC voltages through end surfaces of the reverse electrodes.

Lead wires or flexible print plates or the like may be interposed between the reverse electrodes 8A and 9A to enable application of AC voltages to the reverse electrodes 8A and 9A. In this case, however, close contact between the vibration member 1 and the piezoelectric element 2 is impaired, resulting in a deterioration in motor performance, e.g., a reduction in efficiency.

SUMMARY OF THE INVENTION

It is an object of the present invention to provide a vibration motor in which electric energy can be supplied to each piezoelectric element with improved reliability.

It is another object of the present invention to provide a vibration motor in which each piezoelectric element and the elastic vibrating member can be maintained in desired close contact with each other.

In one aspect, the invention provides a vibration member for a vibration wave driven motor comprising an electro-mechanical energy conversion member having a first surface and a second surface opposite thereto, a vibration member adjacent the first surface, first and second electrodes formed respectively on the first and second surfaces of the conversion member, a third electrode formed on the second surface of the conversion member, and an electrical conductor for electrically connecting the first electrode and the third electrode.

Other objects of the present invention will become clear from the following detailed description of the invention.

BRIEF DESCRIPTION OF THE DRAWINGS

FIG. 1a is a cross-sectional view of the stator;

FIGS. 1b and 1c are diagrams of an electrode pattern on the piezoelectric element;

FIGS. 2a to 2c are diagrams of a modification of the embodiment shown in FIGS. 1a to 1c;

DESCRIPTION OF THE PREFERRED EMBODIMENTS

Figure 1A:
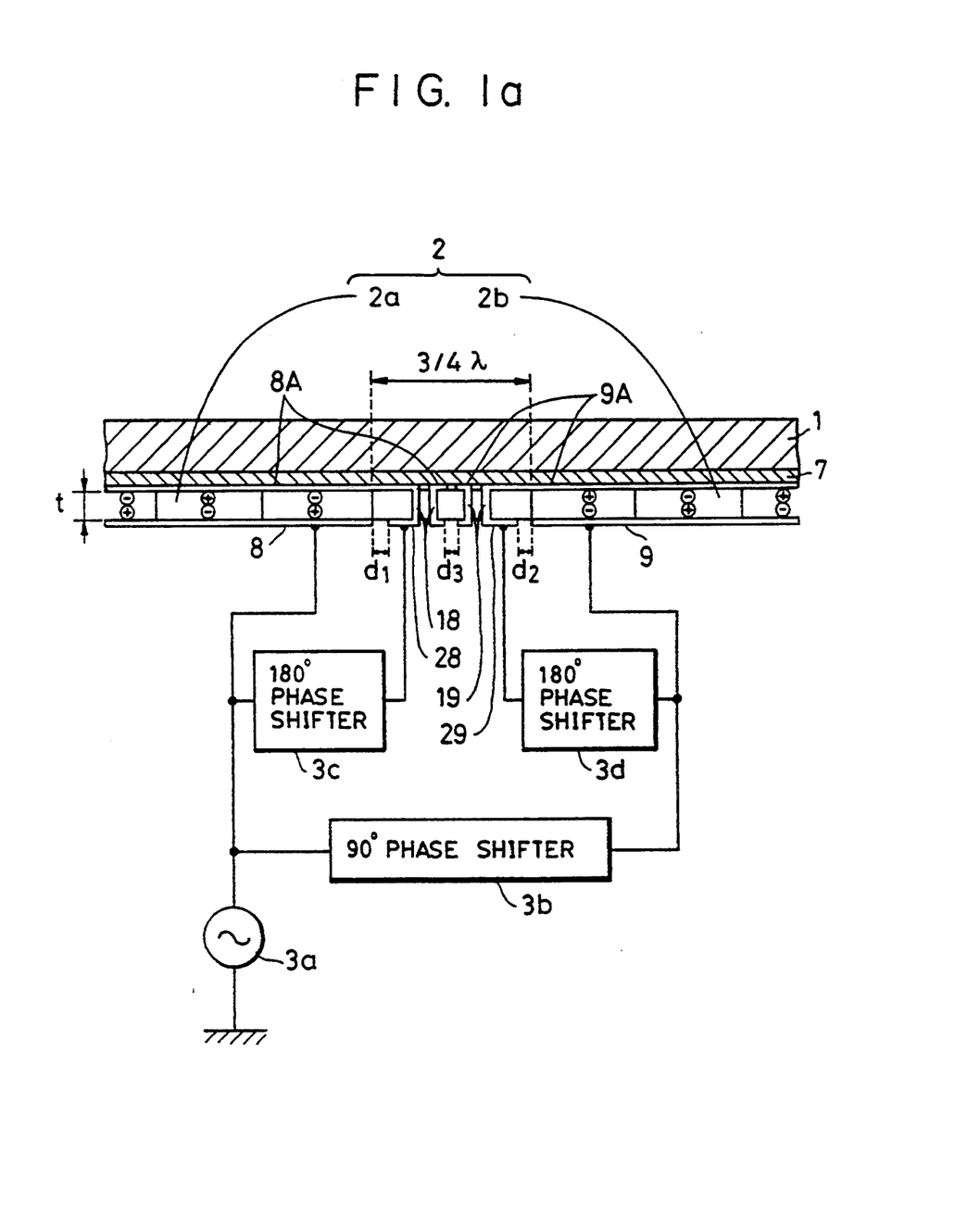
FIGS. 1a to 1c show a vibration wave motor in accordance with an embodiment of the present invention.
Figure 1B:
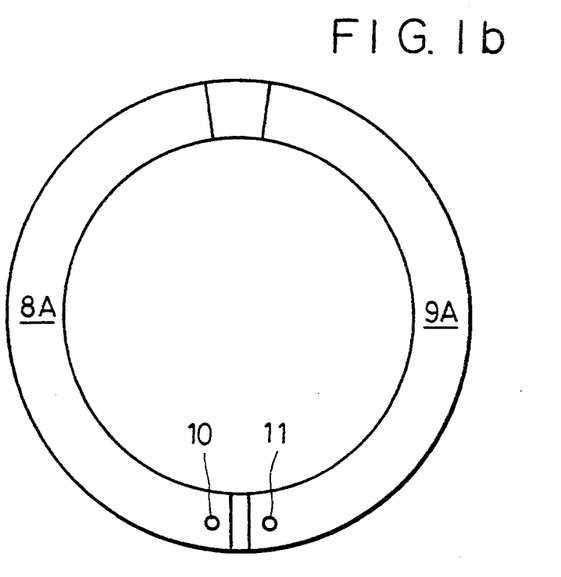
Figure 1C:
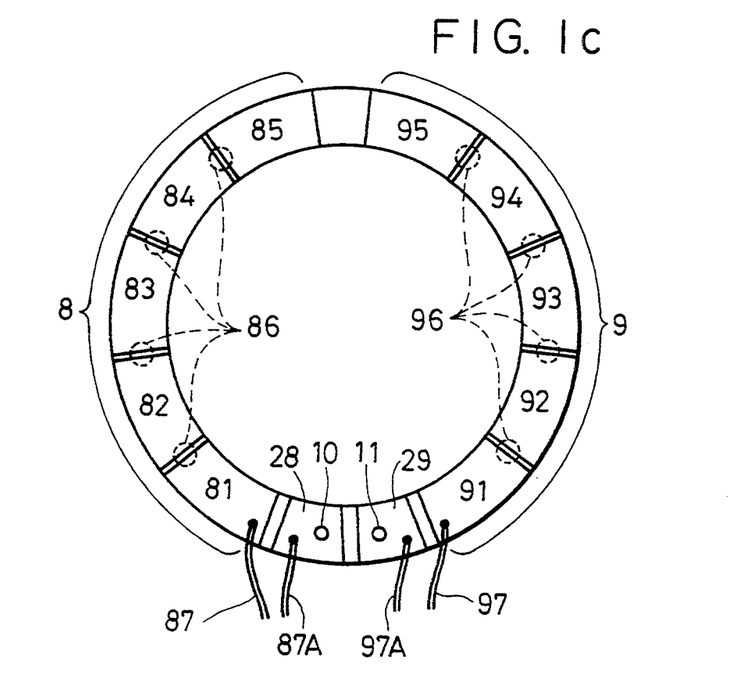

Features of the present invention are shown in FIGS. 1a to 1c. FIG. 1a is a developed view of a section of the stator cut in the circumferential direction, FIGS. 1b and 1c are diagrams of the reverse surface (on the vibrating member 1 side) and the obverse surface of a piezoelectric element 2, e.g., a PZT ceramic element connected to an electrically conductive elastic vibrating member 1 and an insulator 7. For convenience, FIG. 1c shows a mirror image of the actual pattern. A group of electrodes 81 to 85 formed by, for example, depositing a metal or applying a conductive paste are provided for one group 2a of two groups of piezoelectric elements 2a and 2b. A reverse electrode 8A of the group of elements 2a is grounded. Plus and minus voltages are applied to the group of electrodes 81 to 85 by being alternatively distributed so that the group of elements 2a are polarized as indicated by $\oplus$ and $\ominus$ in FIG. 1a. After polarization, conductive members 86 for conduction between the group of electrodes 81 to 85 are formed by, for example, applying a conductive paste, thereby forming an obverse electrode 8 of the group of piezoelectric elements 2a in which the group of electrodes 81 to 85 are electrically connected and which is connected to a lead wire 87.

A through hole 10 is formed through the layer of piezoelectric elements, and a conductive member 18 is formed on the inner surface of the through hole 10 by, for example, plating to electrically connect the reverse electrode 8A of the group of piezoelectric elements 2a and a reverse electrode 28 provided on the obverse side (hereinafter referred to as "obverse-side reverse electrode"). A lead wire 87A is connected to the obverse-side reverse electrode and is, of course, conductive to the reverse electrode 8A. The electrodes and conductor members on the piezoelectric element group 2a side are thus provided. Also, the electrodes and conductive members of the other group of piezoelectric elements 2b are provided in the same manner, the group of piezoelectric elements 2b being located at a distance of $\frac{3}{4}$ wavelength in terms of phase from the group of piezoelectric elements 2a. Members 91 to 97, 97A, 9, 9A, 11, 19 and 29 of the group of piezoelectric elements 2b are the same as in principle the groups of electrodes 81 to 85, conductive members 86, lead wires 87 and 87A, obverse electrode 8, reverse electrode 8A, hole 10, conductive member 18, and obverse-side reverse electrode 28 of the group of piezoelectric elements 2a. The components of this arrangement indicated by the same reference characters as those shown in FIGS. 9 to 11 have the same functions.

In the thus-constructed stator, a voltage of $V=\frac{1}{2}V_0\sin\omega t$ is applied to the obverse electrode 8 of the group of piezoelectric elements 2a from an AC power source 3a through the lead wire 87, a voltage of $V=\frac{1}{2}V_0\sin(\omega t+\pi)$ is applied to the reverse electrode 8A through a 180° phase shifter 3c and the lead wire 87A, a voltage of $V=\frac{1}{2}V_0\sin(\omega t\pm\pi/2)$ is applied to the obverse electrode 9 of the other group of piezoelectric elements 2b through a 90° phase shifter 3b and the lead wire 97, and a voltage of $V=\frac{1}{2}V_0\sin(\omega t\pm 3\pi/2)$ is applied to the reverse electrode 9A of the other group of piezoelectric elements 2b through a 180° phase shifter 3d and the lead wire 97A. (+) and (−) in the above equations are changed over by the phase shifter 3b according to the direction in which the movable member (not shown) which is known per se is moved. It is assumed here that g(−) is selected and that the voltages of $V=\frac{1}{2}V_0\sin(\omega t-\pi/2)$ and $V=\frac{1}{2}V_0\sin(\omega t-3\pi/2)$ are being applied to the obverse electrode 9 and the reverse electrode 9A of the group of piezoelectric elements 2b, respectively. If the voltages of $V=V_0\sin\omega t$ and $V=V_0\sin(\omega t+\pi)$ are simultaneously applied respectively to the obverse electrode 8 and the reverse electrode 8A of the group of piezoelectric elements 2a, a traveling vibration wave in the direction X is generated as in the case of the conventional vibration motor shown in FIG. 9. The principle of traveling of the movable member is the same as that described above with reference to FIG. 10 with respect to the conventional vibration wave motor. In this embodiment, it is preferable to set the frequency of the AC voltage to a frequency close to the out-of-plane sixth deflection mode frequency, because the amplitude of vibration of the vibrating member 1 is increased at this frequency.

In this embodiment, if the same AC power source 3a as that for use with the conventional vibration motor shown in FIG. 10 is used, the electric field produced at each of the piezoelectric elements 2a and 2b is twice as large as that in the case of the conventional motor, because the AC voltage 180° out of phase with the AC voltage applied to the obverse electrode is applied to the reverse electrode. That is, an AC power source the voltage level of which is half that required by the conventional vibration motor shown in FIG. 9 can be used to obtain the same amplitude of the vibrating member, torque and rotational speed as the conventional vibration motor.

In the structure of this embodiment, obverse-side reverse electrodes 28 and 29 are provided so that voltages can be applied to reverse electrodes 8A and 9A from the obverse side. It is thereby possible to supply power as desired while maintaining the vibrating member 1, the insulator 7 and piezoelectric element 2 in close contact with each other.

In the above-described embodiment, the electrode or polarization pattern provided on the piezoelectric element 2 has the same pitch as the out-of-plane sixth deflection mode. However, it may alternatively have a pitch equal to the pitch of a difference natural vibration mode. A mode such as one including a node in the circumferential direction is also possible. The present invention is effective with respect to all vibration motors in which electrodes are provided on the bonding side of the piezoelectric element and in which the vibrating member and these electrodes are insulated from each other.

In the above-described embodiment, the groups of piezoelectric elements 2a and 2b form one piezoelectric member 2. However, in other cases where piezoelectric elements are formed as separate piezoelectric members or where groups of piezoelectric elements form a plurality of piezoelectric members, each reverse electrode can be electrically connected to an obverse surface region (obverse-side reverse electrode) through a conductive member formed on a surface generally perpendicular to the piezoelectric element surface to apply a voltage from the obverse-side reverse electrode.

Figure 2A:
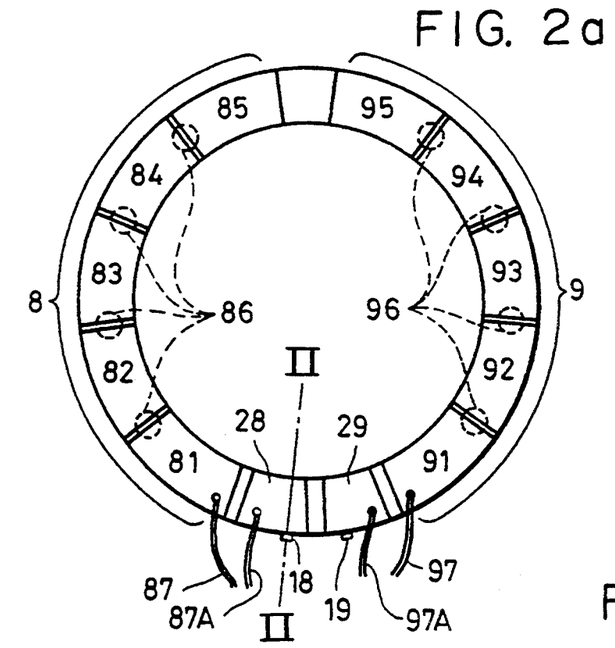
FIGS. 2a and 2b are diagrams of an electrode pattern.
Figure 2B:
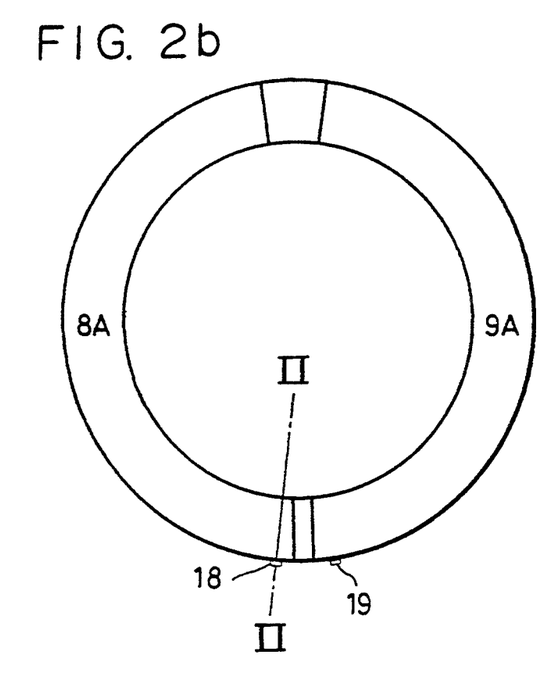
Figure 2C:
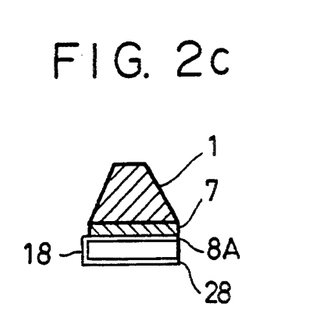
FIG. 2c is a cross-sectional view taken along the line II—II of FIGS. 2(a) and 2(b)

In the above-described embodiment, the surface generally perpendicular to the piezoelectric element surface is provided as the through hole surface. However, it is not limited to the through hole surface and may be formed as a piezoelectric element end surface, as shown in FIGS. 2a, 2b, and 2c.

Figure 3A:
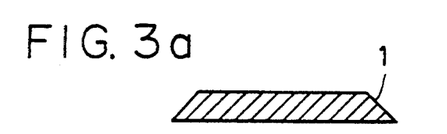
FIGS. 3a to 3h are diagrams of a process of manufacturing the stator of the embodiment shown in FIG. 1.
Figure 3B:
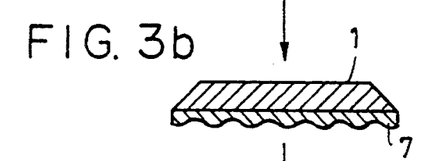
Figure 3C:
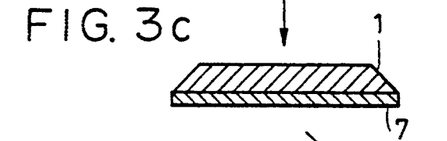
Figure 3D:
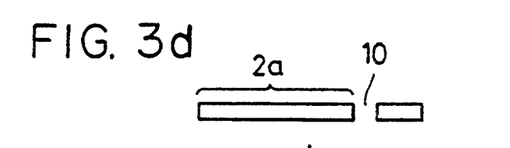
Figure 3E:
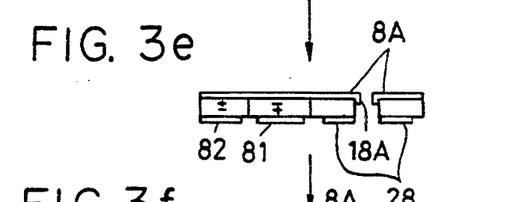
Figure 3F:
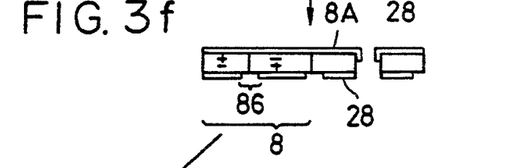
Figure 3G:
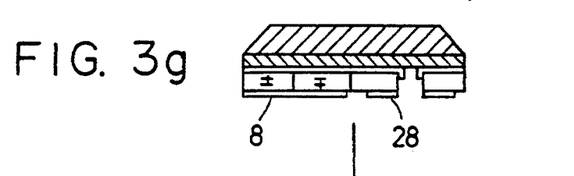
Figure 3H:
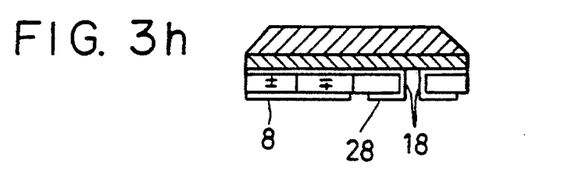

Preferably, at least portions of the conductive members 18 and 19 bordered on the reverse electrodes, which conductive members 18 and 19 are formed on the surfaces generally perpendicular to the piezoelectric element surfaces, are formed before the step of bonding the piezoelectric member 2 and the vibrating member 1. A process in which these portions are formed will be described below with reference to FIGS. 3a to 3h. Vibrating member 1 to be bonded to piezoelectric member 2 undergoes the step of providing insulator 7 as shown in FIG. 3b (which step is unnecessary if the vibrating member 1 is formed of an insulating material), and the bonding surface is polished in the step of FIG. 3c to enable desired close contact. This polishing is unnecessary if the vibrating member 1 has already been polished on its bonding side and provided that the insulator is formed uniformly by the step of FIG. 3b. For example, polishing in the step of FIG. 3c is unnecessary in a case where the vibrating member 1 is formed of aluminum (Al) and is polished on its bonding side in the step of FIG. 3a, and where an alumire layer having a thickness of several microns to several ten microns is formed by anode oxidation or the like in the step of FIG. 3b. Piezoelectric elements are bonded to the thus-provided vibrating member covered with the insulator, as described below. In the step of FIG. 3d, piezoelectric ceramic 2 (2a), e.g., PZT, is formed and sintered and the bonding surface of this ceramic member is polished to enable desired close contact. In the step of FIG. 3e, obverse electrodes 81 to 85, reverse electrode 8A, portion 18A of conductive member 18 formed on the internal surface of hole 10 which portion 18A is bordered on reverse electrode 8A, obverse-side reverse electrode 28 are formed as polarizing electrodes by deposition of a metal, screen printing of a conductive paste or other methods. If the portion 18A is formed by depositing a metal, deposited molecules are made to move round to the hole 10 surface at the time of formation of the reverse electrode 8A. If a conductive paste is formed by screen printing, the conductive paste is made to flow into the hole 10 surface so as to partially cover the same. Thus, in either case, the portion 18A can be formed at the time of formation of reverse electrode 8A; it can be provided without making the process complicated. Polarization is effected by using the electrodes formed in this manner. In the step of FIG. 3f, the obverse electrodes 81 to 85 are connected by conductive members 86 to form obverse electrode 8. The piezoelectric ceramic member on which polarized electrodes are formed in this manner is bonded (in the step of FIG. 3g) to the vibrating member with the insulator processed by the steps of FIGS. 3a to 3c. Finally, a conductive member is formed on the internal hole surface by, for example, the method of applying the conductive paste to the hole surface to establish electrical connection between the reverse electrode 8A and the obverse-side reverse electrode 28. In a case where the portion 18A of the conductive member on the hole surface bordered on the reverse electrode 8A is not formed in any step before the bonding step, and where the conductive member is bonded to the hole surface, it is very difficult to electrically connect the conductive member 18 on the hole surface to the reverse electrode 8A because the thickness of the reverse electrode 8A is very small (e.g., ordinarily 1 $\mu$m or less if this electrode is formed by deposition). However, if a process step such as that shown in FIG. 3 is conducted, the electrical connection can be established therebetween with reliability without requiring a complicated process. Also the conductive member 18 can be formed so as to ensure the desired close contact between the bonding surfaces.

In the process shown in FIG. 3, the conductive member 18 is formed on the hole inner circumferential surface alone. However, it may be formed so as to completely close the hole in the step of FIG. 3h. Although the formation of only the group of piezoelectric elements 2a has been described with reference to FIG. 3, the other group of piezoelectric elements 2b can be formed by the same process.

Figure 4A:
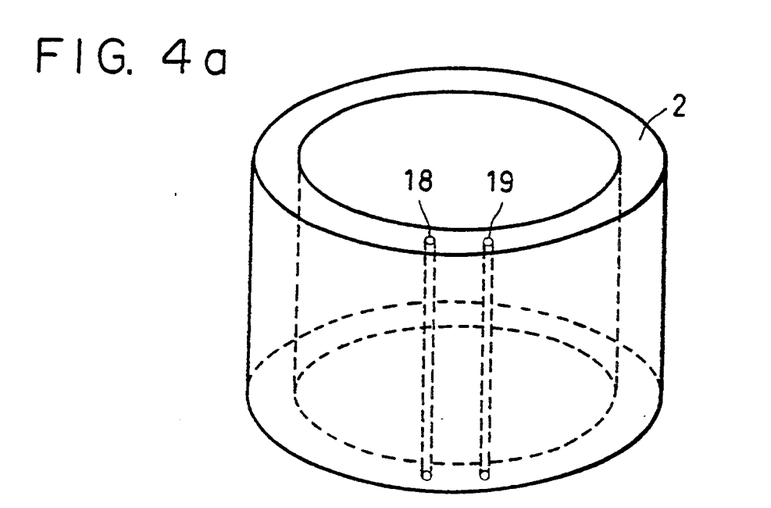
FIGS. 4a to 4e are diagrams of another stator manufacturing process.
Figure 4B:
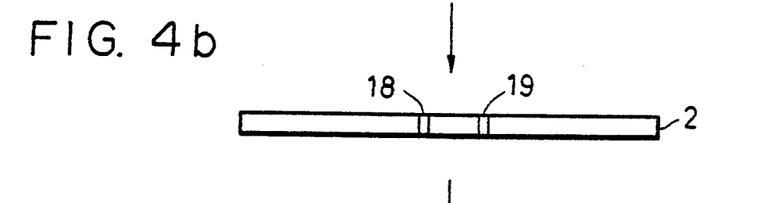
Figure 4C:
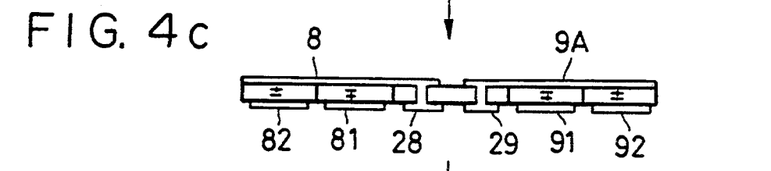
Figure 4D:
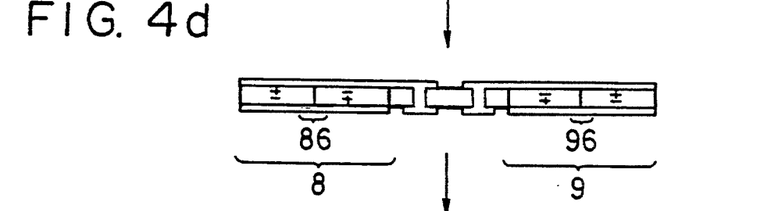
Figure 4E:
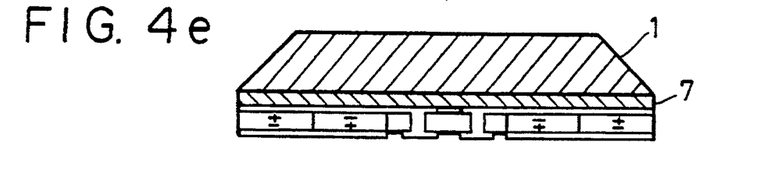

Another process of forming the conductive member formed on the surface generally perpendicular to the piezoelectric element surface will be described below with reference to FIGS. 4a to 4e. First, as shown in FIG. 4a, piezoelectric ceramic 2 such as PZT is formed and sintered with conductive members 18 and 19 previously embedded therein. The sintered block is sliced into flat pieces, and bonding surfaces of the sliced pieces are polished to enable desired close contact (step of FIG. 4b). Thereafter, obverse electrodes 81 to 85, and 91 to 95, reverse electrodes 8A and 9A, obverse-side reverse electrodes 28 and 29 are formed by, for example, deposition on each piezoelectric member, followed by polarization. Further, conductive members 86 and 96 are provided to form obverse electrodes 8 and 9 (step of FIG. 4d). The same process steps as those of FIGS. 3a to 3c are thereafter conducted, and the piezoelectric member is bonded to the vibrating member 1 to which insulator 7 is attached (step of FIG. 4e). The conductive members embedded before sintering establish reliable electrical connections between the reverse electrode 8A and the obverse-side reverse electrode 28 and between the reverse electrode 9A and the obverse-side reverse electrode 29. Since in the step of FIG. 4b the bonding surface of the piezoelectric ceramic member formed is polished, the vibrating member 1 and the insulator 7 can be maintained in desired closed contact with each other. The material of the conductive members 18 and 19 is, preferably, a stable material which is not changed in conductive properties by being melted at the sintering temperature, or by being diffused or oxidized, because it is fired together with the piezoelectric ceramic. For example, PZT which is a piezoelectric ceramic is ordinarily sintered at a temperature of 1100° to 1200° C. and, if PZT is used, gold wires, silver paste, silver-palladium alloy or the like may preferably be used. In the process shown in FIGS. 4a to 4e, the piezoelectric ceramic is formed into a cylindrical shape and sintered in this form. However, conductive members 18 and 19 can be formed in the same manner in the case of other forming methods, e.g., a sheet forming method in which a sheet member is punched out and sintered. In this case, conductive members may be embedded simultaneously with or before or after punching and sintering may thereafter be effected.

As described above with reference to FIGS. 3 and 4, at least a portion of the conductive member formed on the surface of the piezoelectric member generally perpendicular to the bonding surface of the same which portion is bordered on the reverse electrode is formed before bonding, thereby enabling reliable electrical connection between the reverse electrode and the obverse-side reverse electrode as well as desired close contact between the piezoelectric member and the vibrating member.

Figures 5, 6:
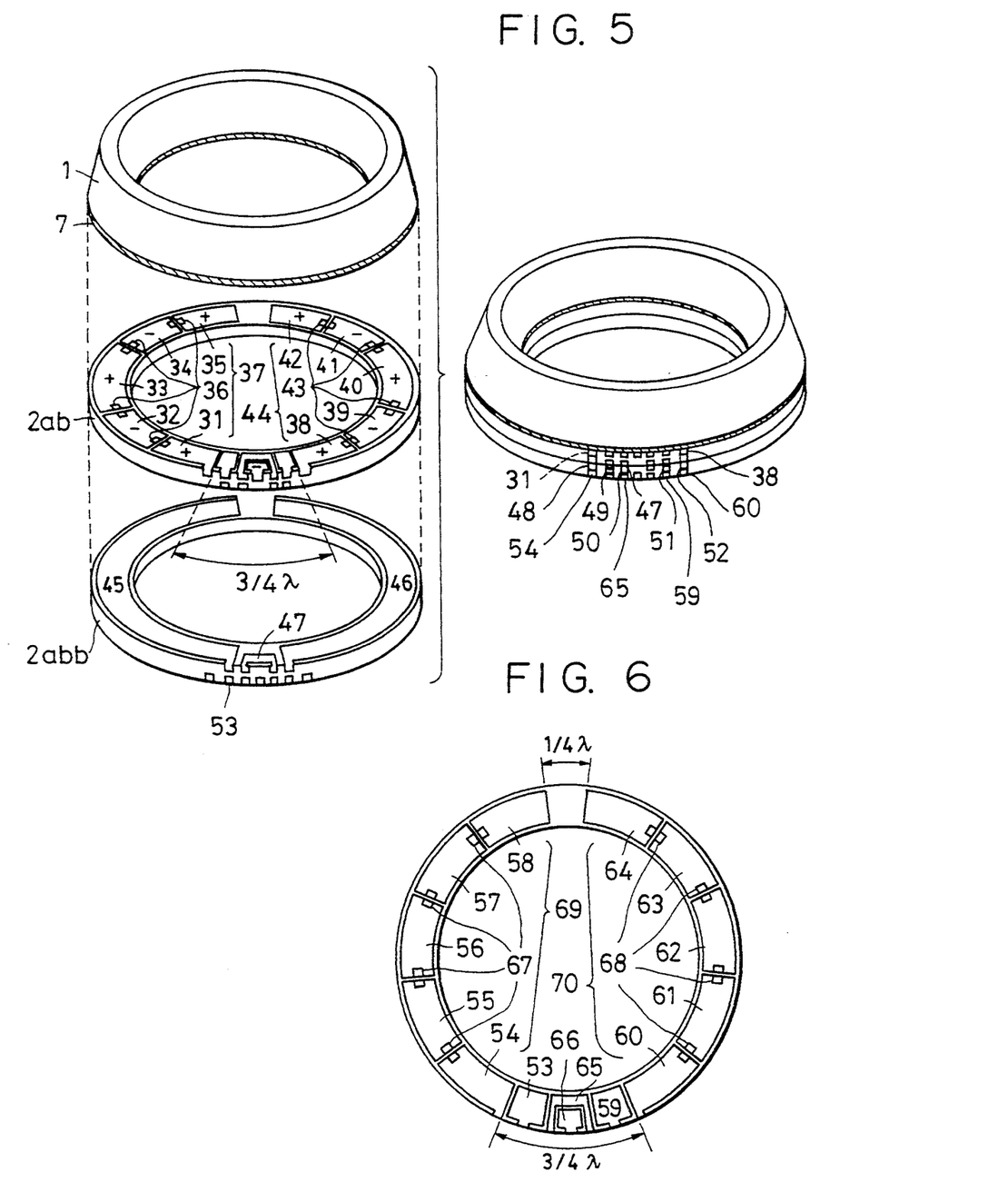
FIGS. 5 and 6 are an exploded perspective view and an electrode pattern diagram, respectively, of a second embodiment of the present invention.

FIG. 5 shows another embodiment of the present invention wherein the present invention is applied to a vibration wave motor in which two layers of piezoelectric ceramic are superposed on each other. The piezoelectric ceramic is laminated to obtain the same performance while further reducing the AC voltage in half again; the same performance can be obtained by an AC voltage which is ¼ the voltage required by the conventional vibration wave motor in which piezoelectric elements and electrodes are arranged as shown in FIG. 9. A piezoelectric ceramic member 2ab is bonded to vibrating member 1 on which insulator 7 is provided, and another piezoelectric ceramic member 2abb is bonded to the piezoelectric member 2ab. The electrode pattern of the piezoelectric ceramic member 2ab on the vibrating member side (hereinafter referred to as reverse side) is as illustrated in FIG. 5, and is the same as the electrode pattern of the piezoelectric ceramic member 2abb on the side remote from the vibrating member (hereinafter referred to as obverse side). For convenience, FIG. 6 shows a mirror image of the actual pattern. The pattern of obverse electrodes of the piezoelectric ceramic member 2ab is the same as that of reverse electrodes of the piezoelectric element member 2abb. That is, the electrode patterns of the piezoelectric ceramic members 2ab and 2abb superposed on each other are equal to each other, but face in opposite directions. A manufacture process will now be described below. The vibrating member 1 on which the insulator 7 is provided is the same as that of the embodiment shown in FIG. 3. Electrodes are formed on the piezoelectric ceramic members as described below. Electrodes 31 to 35, and 38 to 42 (exclusive of electrodes 36 and 43) are formed on the reverse surface of the piezoelectric ceramic member 2ab, and electrodes in the same pattern as that of reverse electrodes of the piezoelectric ceramic member 2abb disposed below are formed on the obverse surface (not shown) of the piezoelectric ceramic member 2ab. Electrodes 45, 46, and 47 are formed on the reverse surface of the lower piezoelectric ceramic member 2abb, and electrodes 53 to 66 are formed on the obverse surface thereof in correspondence with those of the upper piezoelectric ceramic member 2ab. At this time, the electrodes 31, 38, 45, 47, 46, 54, 53, 65, 66, 59, and 60 are formed so as to be exposed at end surfaces of the piezoelectric ceramic members, as illustrated. The upper piezoelectric ceramic member 2ab is polarized in the direction of thickness to have opposite polarities as indicated by (+) and (−) in FIG. 5 with respect to the reverse side. The lower piezoelectric ceramic member 2abb is polarized in the same manner as the upper piezoelectric ceramic member 2ab, so that the piezoelectric ceramic members 2ab and 2abb have the same electrode and polarization patterns. After polarization, conductive members 36 and 43 are formed on the reverse surface of the upper piezoelectric ceramic member 2ab, and conductive members 67 and 68 are formed on the obverse surface of the lower piezoelectric ceramic member 2abb. The electrodes 31 to 35, and 36 thereby electrically connected form a group of reverse electrodes 37, and the electrodes 31 to 35, and 36 are thereby electrically connected to form a group of reverse electrodes 37. The other electrodes form a group of reverse electrodes 44 of the piezoelectric ceramic member 2ab and groups of obverse electrodes 69 and 70 of the piezoelectric ceramic member 2abb. The spacing between the groups of electrodes 37 and 44 and the spacing between the groups of electrodes 69 and 70 correspond to ¾ wavelength as shown in FIGS. 5 and 6. These electrodes and conductive members are, preferably, deposited metal films having a thickness of 1 μm or less if close contact for bonding is considered. Then, the vibrating plate 1 on which the insulator 7 is formed and the piezoelectric ceramic members 2ab and 2abb are bonded, and electrical connections are established between the electrodes 31 and 54, between the electrodes 45 and 53, between the electrodes 47 and 65, between the electrodes 46 and 59, and between the electrodes 38 and 60 by the conductive members 48 to 52. Also, by the bonding between the piezoelectric ceramic members 2ab and 2abb, the unillustrated obverse electrode of the upper piezoelectric ceramic member 2ab corresponding to the group of reverse electrodes 37 is electrically connected to the reverse electrode 45 of the lower piezoelectric ceramic member 2abb, while the unillustrated obverse electrode of the upper piezoelectric ceramic member 2ab corresponding to the group of reverse electrodes 44 is electrically connected to the reverse electrode 46. It is thereby possible to effect electricity supply to the group of reverse electrodes 37 of the upper piezoelectric ceramic member 2ab and the group of obverse electrodes 69 of the lower piezoelectric ceramic member 2abb through the electrode 54, to the unillustrated obverse electrode of the upper piezoelectric ceramic member 2ab corresponding to the group of reverse electrodes 37 and the reverse electrode 45 of the lower piezoelectric ceramic member 2abb through the electrode 53, to the group of reverse electrodes 44 of the upper piezoelectric ceramic member 2ab and the group of obverse electrodes 70 of the lower piezoelectric ceramic member 2abb through the electrode 60, and to the unillustrated obverse electrode of the upper piezoelectric ceramic member 2ab corresponding to the group of reverse electrodes 44 and the reverse electrode 46 of the lower piezoelectric ceramic member 2abb through the electrode 59. The same operation as that of the embodiment shown in FIG. 1 can be performed by respectively applying AC voltages of $V = \frac{1}{4}Vo\sin\omega t$, $V = \frac{1}{4}Vo\sin(\omega T + \pi)$, $V = \frac{1}{4}Vo\sin(\omega t \pm \pi/2)$, and $V = \frac{1}{4}Vo\sin(\omega t \pm 3\pi/2)$ to these electrodes. The electrodes 65 and 66 serve to monitor the voltage generated by vibration of the piezoelectric ceramic element interposed between the electrodes 47 and 66. Information on whether or not the piezoelectric ceramic element is in a resonating state can be obtained from the phase and amplitude of the wave voltage corresponding to the vibration, and this element can be used as vibration sensor for speed control or the like.

Figure 7:
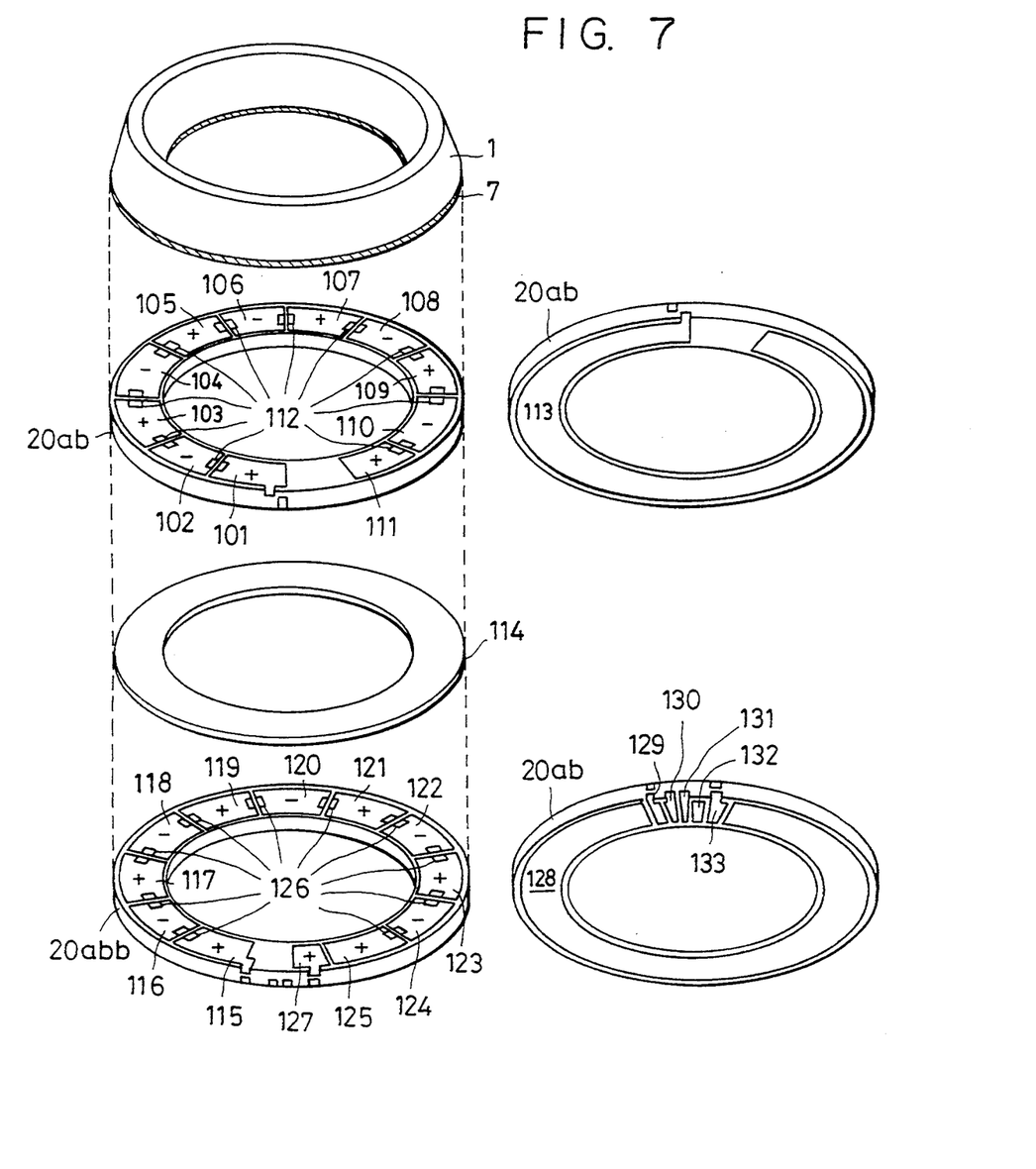
FIGS. 7 and 8 are an exploded perspective view and a perspective view, respectively, of a third embodiment of the present invention.

In the embodiment of FIG. 5, two groups of electrodes (groups of piezoelectric elements) with a spacing corresponding to $\frac{3}{4}$ wavelength are provided in one piezoelectric ceramic member. Alternatively, the arrangement may be such that, as in the case of another embodiment shown in FIGS. 7 and 8, each of a pair of piezoelectric ceramic members has one group of electrodes (group of piezoelectric elements), and that the piezoelectric ceramic members are bonded so that their groups of electrodes (groups of piezoelectric elements) are shifted from each other by $\lambda/4$ in terms of phase. In this case, as shown in FIG. 7, electrodes 101 to 111 and an electrode 113 are formed as polarizing electrodes on the reverse and obverse surfaces of an upper piezoelectric ceramic member 20ab, respectively, and the piezoelectric ceramic member is polarized in the direction of thickness so as to have opposite polarities as indicated by (+) and (−). The electrodes 101 and 103 are formed so as to have a terminal portion exposed at an end surface of the upper piezoelectric ceramic member 20ab, as shown in FIG. 7. Conductive members 112 are then formed to electrically connect the electrodes 101 to 111 to form a reverse electrode for driving the upper piezoelectric ceramic member 20ab. The polarizing electrode 113 serves as the obverse electrode of the upper piezoelectric ceramic member 20ab after polarization.

Figure 8:
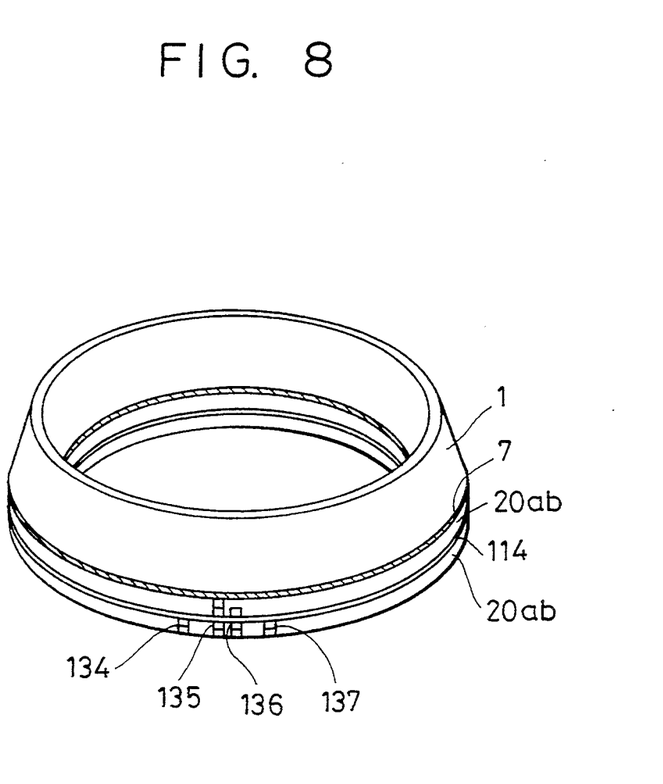

Electrodes 115 to 125 and an obverse electrode 128 are formed on a lower piezoelectric ceramic member 20abb, this piezoelectric ceramic member is thereby polarized, and conductive members 126 are formed thereon, thereby forming obverse and reverse electrodes in the same manner as the upper piezoelectric ceramic member 20ab. On the lower piezoelectric ceramic member 20abb are further formed, as shown in FIG. 7, an electrode 129 for electricity supply to the reverse electrode of the lower piezoelectric ceramic member 20abb, an electrode 130 for electricity supply to reverse side of the upper piezoelectric ceramic member 20ab, an electrode 131 for electricity supply to obverse side, an obverse electrode 132 of a vibration sensor, a reverse electrode 127 of the vibration sensor, and an electrode 133 for electrical connection to the reverse electrode of the vibration sensor. The portion of the piezoelectric ceramic member 20abb between the reverse electrode 127 and the obverse electrode 132 is polarized in the direction of thickness. The electrodes 115, 127, 129, 130, 131, and 133 are formed so as to be exposed at an end surface of the piezoelectric ceramic member 20abb. A vibrating member 1 on which an insulator 7 is formed, the upper piezoelectric ceramic member 20ab, an insulator 114, and the lower piezoelectric ceramic member 20abb are bonded so that the reverse electrode patterns of the upper piezoelectric ceramic member 20ab and the lower piezoelectric ceramic member 20abb are shifted from each other by $\frac{1}{4}$ wavelength. After this bonding, conductive members 134 to 137 are formed as shown in FIG. 8, thereby establishing electrical connections between the electrodes 129 and 115, between the electrodes 130 and 101, between the electrodes 131 and 113, and between the electrodes 133 and 127. It is thereby possible to effect electricity supply to the obverse electrode of the upper piezoelectric ceramic member 20ab through the electrode 131, to the reverse electrode through the electrode 130, to the obverse electrode of the lower piezoelectric ceramic member 20abb through the obverse electrode 128, and to the reverse electrode of the lower piezoelectric ceramic member 20abb through the electrode 129. A vibration sensor output voltage can be obtained between the electrodes 132 and 133. The same operation as that of the embodiment shown in FIG. 1 can be performed by respectively applying AC voltages of $V = \frac{1}{4}Vo\sin\omega t$, $V = \frac{1}{4}Vo\sin(\omega t + \pi)$, $V = \frac{1}{4}Vo\sin(\omega t \pm \pi/2)$, and $V = \frac{1}{4}Vo\sin(\omega T \pm 3\pi/2)$ to the electrodes 129, 128, 130, and 131. For electricity supply to the electrodes 129, 128, 130, and 131, lead wires may be used as shown in FIGS. 1 and 2, a flexible printed circuit board may be directly bonded to the motor, or flexible printed circuit board may be bonded with an anisotropic conductive sheet conductive in the direction of thickness alone interposed between the printed circuit board and the motor.

According to the present invention, as described above, electric currents can be supplied to an electrode of electro-mechanical conversion elements, e.g., piezoelectric elements facing the bonding surfaces of the elastic vibrating member and the piezoelectric elements without providing, e.g., lead wires therebetween. In particular, in a case where the elastic vibrating member and the piezoelectric elements are insulated from each other, electric currents can be supplied to electrodes of the piezoelectric elements with reliability while the piezoelectric elements and the elastic vibrating member are maintained in desired close contact with each other.

In a case where electro-mechanical conversion elements are stacked, the present invention also enables simple and reliable connection between electrodes of the stacked electro-mechanical conversion elements.

What is claimed is:

1. A stator for a vibration wave driven motor including a contact member frictionally driven by the stator, said stator comprising:

a vibration member having a contact surface for frictionally driving the contact member, the vibration member and the contact member being relatively moved by vibration of the vibration member;

an electro-mechanical energy conversion member having a first surface and a second surface opposite the first surface, the first surface being adjacent the vibration member and having a shape substantially the same as the vibration member;

a first electrode formed on said first surface, said first electrode being arranged for receiving a first potential;

a second electrode formed on a first portion of said second surface, said second electrode being arranged for receiving a second potential having a polarity opposite that of the first potential, said conversion member causing a vibration wave to be generated in said vibration member when said first and second potentials are respectively applied to said first and second electrodes;

a third electrode formed on a second portion of the second surface of said conversion member, said third electrode forming a first potential input portion for said first electrode; and an electric conductor for electrically connecting said first electrode and said third electrode.

2. A stator for a vibration wave driven motor according to claim 1, wherein said electric conductor is formed on a surface of a through hole formed through said conversion member between the first and second surfaces of the same.

3. A stator for a vibration wave driven motor according to claim 1, wherein said electric conductor electrically connects side end surfaces of the first electrode formed on said first surface and the third electrode formed on said second surface.

4. A stator for a vibration wave driven motor according to claim 1, wherein said vibration member is formed of an electrically conductive member.

5. A stator for a vibration wave driven motor according to claim 1, wherein said vibration member is formed of aluminum.

6. A stator for a vibration wave driven motor according to claim 4, further comprising an insulator provided between said first electrode and a joining surface of said vibration member facing said first electrode, said insulator serving to prevent electrical short circuit between said vibration member and said first electrode.

7. A stator for a vibration wave driven motor according to claim 1, wherein said vibration member is formed of an insulating material.

8. A stator for a vibration wave driven motor according to claim 1, wherein portions of the first electrode formed on said conversion member and said electric conductor are preformed on said electro-mechanical energy conversion member.

9. A vibration device for a vibration wave driven apparatus having a contact member frictionally driven by said vibration device, said device comprising:

an elastic member having a contact surface for frictionally driving the contact member, the elastic member and the contact member being relatively moved by vibration of the elastic member;

a polarized electro-mechanical energy conversion member having a first surface and a second surface, the first surface being adjacent the elastic member and having a shape substantially the same as the elastic member;

a first electrode formed on said first surface, said first electrode being arranged for receiving a first electrical signal with a first potential;

a second electrode formed on a first portion of said second surface, said second surface being arranged for receiving a second electrical signal with a second potential having a polarity opposite that of the first potential, said conversion member causing a vibration wave to be generated in said elastic member in response to the electrical signals applied to the respective electrodes;

a third electrode formed on a second portion of the second surface of said conversion member, said third electrode forming a first electrical signal input portion for the first electrode; and an electric conductor for electrically connecting said first electrode and said third electrode.

10. A vibration device according to claim 9, further comprising an insulator inserted between said elastic member and said first electrode to insulate the first electrode from said elastic member.

11. Apparatus for frictionally driving a movable member with a vibration wave, said apparatus comprising;

an electrically conductive elastic member having a contact surface for frictionally driving the movable member;

piezoelectric means having adjacent regions separated from each other polarized in different directions, a first surface, and a second surface opposite the first surface, the first surface being adjacent the elastic member, having a shape substantially the same as the elastic member, and being frictionally engaged;

a first electrode formed on said first surface of said piezoelectric means, said first electrode being arranged for receiving a first electrical signal with a first potential;

a second electrode formed on a first portion of said second surface of said piezoelectric means, said second electrode being arranged for receiving a second electrical signal with a second potential having a polarity opposite that of said first potential, said piezoelectric means causing a vibration wave to be generated in said elastic member when said first and second signals are respectively applied to said first and second electrodes;

a third electrode formed on a second portion of the second surface of said piezoelectric means, said third electrode forming a first electrical signal input portion for said first electrode; and an electric conductor for electrically connecting said first electrode and said third electrode.

12. Apparatus according to claim 11, wherein said piezoelectric means includes first and second piezoelectric elements disposed with a spatial phase difference.

13. Apparatus according to claim 12, further comprising a drive circuit for applying signals having an electrical phase difference to said first and second piezoelectric elements respectively.

14. Apparatus according to claim 13, wherein said first signal is 180° out of phase with said second signal.

* * * * *

UNITED STATES PATENT AND TRADEMARK OFFICE
CERTIFICATE OF CORRECTION

PATENT NO. : 5,448,127
DATED : Sept. 5, 1995
INVENTOR(S) : Hajime Kanazawa

It is certified that error appears in the above-indentified patent and that said Letters Patent is hereby corrected as shown below:

On title page,

At [56] U.S. PATENT DOCUMENTS

"Tibbbetts" should read --Tibbetts--; and
"Padice" should read --Radice--.

At [56] FOREIGN PATENT DOCUMENTS

"2231969 9/1990 Japan" should read --2-231969 9/1990 Japan--

Column 2,

Line 39, "8A, A." should read --8A, 9A.--

Column 4,

Line 43, "g(-)" should read --(-)--.

Column 5,

Line 62, "alumire" should read --alumite--.

UNITED STATES PATENT AND TRADEMARK OFFICE
CERTIFICATE OF CORRECTION

PATENT NO. : 5,448,127
DATED : Sept. 5, 1995
INVENTOR(S) : Hajime Kanazawa

It is certified that error appears in the above-indentified patent and that said Letters Patent is hereby corrected as shown below:

Column 9, line 12,

"$V = \frac{1}{4} V_0 \sin(\omega T + \pi),$" should read
--$V = \frac{1}{4} V_0 \sin(\omega t + \pi),$--.

Signed and Sealed this

Twenty-sixth Day of March, 1996

*Attest:*

BRUCE LEHMAN

*Attesting Officer*       Commissioner of Patents and Trademarks